United States Patent [19]

Kitagawa

[11] 4,402,117
[45] Sep. 6, 1983

[54] DEVICE FOR FIXING TWO PLATES TO ONE ANOTHER

[75] Inventor: Hiroji Kitagawa, Nagoya, Japan

[73] Assignee: Kitagawa Industries Co., Ltd., Nagoya, Japan

[21] Appl. No.: 261,210

[22] PCT Filed: Sep. 22, 1980

[86] PCT No.: PCT/JP80/00213
§ 371 Date: May 7, 1981
§ 102(e) Date: May 7, 1981

[87] PCT Pub. No.: WO81/00895
PCT Pub. Date: Apr. 2, 1981

[30] Foreign Application Priority Data
Oct. 1, 1979 [JP] Japan ..................... 54-136091[U]

[51] Int. Cl.³ .......................................... A44B 17/00
[52] U.S. Cl. .............................................. 24/221 R

[58] Field of Search ............. 24/201 R; 40/20 R, 607, 40/2.2

[56] References Cited
U.S. PATENT DOCUMENTS
3,407,454 10/1968 Myatt ........................... 24/221 R
FOREIGN PATENT DOCUMENTS
1256295 12/1971 United Kingdom ............ 24/221

Primary Examiner—Gene Mancene
Assistant Examiner—Wenceslao J. Contreras
Attorney, Agent, or Firm—Oblon, Fisher, Spivak, McClelland & Maier

[57] ABSTRACT

A fixing device which easily and removably fix a top plate and a base plate and has a structure in which a maleform molded part to be fitted to the top plate is inserted into a female-form molded part to be fitted to the base plate and both are tightly fastened by an engaging rod to achieve fixing.

2 Claims, 9 Drawing Figures

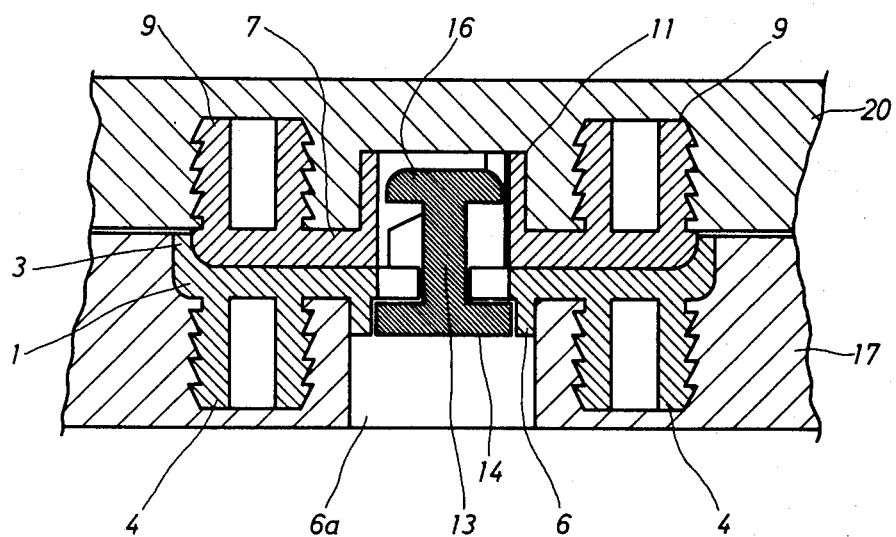

DEVICE FOR FIXING TWO PLATES TO ONE ANOTHER

TECHNICAL FIELD

This invention relates to fixing devices, and more particularly to fixing devices which removably engage base plates and top plates covering the surface thereof.

BACKGROUND ART

As one line of household furniture there are known dining tables and salon tables having decorative patterns such as plants, scenery etc. on the surface. They are ready made in a manufacturing plant by fixing a top surface panel material having a decorative pattern, i.e. a top plate, with leg parts by woodwork or by using metal fixing devices. The reason for that is because if a base plate and a top plate having a decorative pattern were separately fabricated in a plant and assembled at a retailer's shop, this operation would be troublesome and it would be impossible to fix the base plate and the top plate with their four corners in the exact positions. For that reason, the so-called knock-down production of furniture involving top plates has thus been impeded. Also in ordinary homes, coffee shops etc. where such furniture is used, it is difficult to separate both plates. Therefore, for example, when it was desired to change the interior decoration by replacing the top plate by another one having a different pattern or by one having no decoration, according to changes of the seasons, it has been necessary to change the whole piece of furniture, i.e. the dining table, the salon table or the like, into a new one, and therefore very uneconomical. Furthermore, in the case where a scratch or scratches on the top plate of the table become outstanding sufficiently to be rejected for commercial use, it was also necessary to change the whole table into a newly bought one.

This invention provides fixing devices which can be obtained by the knock-down production, which can easily and removably fix a top plate and a base plate (the side where legs are provided) by preparing one base plate and several top plates having different patterns and changing the top plates when the interior decoration is desired to be changed, for example, in each season, and which are in such structure that a molded part, i.e. a male form, to be fixed with a top plate is inserted into another molded part, i.e. female form, to be fixed with a base plate and both plates are tightly fixed and secured by an engaging rod.

DISCLOSURE OF THE INVENTION

Accordingly, this invention is a fixing device which comprises a pair of molded parts which can removably fix a base plate and a top plate covering the surface thereof, which fixing device is characterized by that the surfaces of said pair of molded parts are tightly fastened in such way that one part is inserted into the other by an engaging rod having a head part and a shaft part provided with a T-shaped stopper section at the tip, and further by that said pair of molded parts comprises a saucer-shaped molded part for the base plate, said molded part comprising a through hole provided in the center for said engaging rod to pass through and having a cross section of a ⇌ form, a fringe part around said hole, fixing leg parts on its rear surface to be inserted into fixing holes provided on the base plate, and a cylindrical part situated immediately below said through hole for the head part of said engaging rod to be inserted, and a flat plate-shaped molded part for the top plate and for being tightly inserted into said saucer-shaped molded part for the base plate, said molded part comprising a through hole in the center for said engaging rod to pass through and having a cross section of a ⇌ form, fixing leg parts on its top surface to be inserted into fixing holes provided on the rear surface of the top plate, and a cylindrical part situated immediately below said through hole and having on its inner periphery an engaging structure which engages with the tip stopper section of said engaging rod.

BRIEF DESCRIPTION OF THE DRAWING

The drawing shows one example of this invention; in which.

BEST MODE OF CARRYING OUT THE INVENTION

Figure 1:
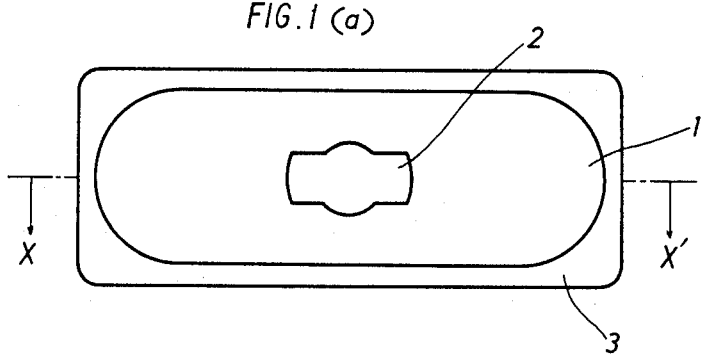
FIG. 1 shows a molded part for a base plate, in which (a) is its top view, (b) is a cross-sectional view of (a) along Line X—X', and (c) is its bottom view.
Figure 1:
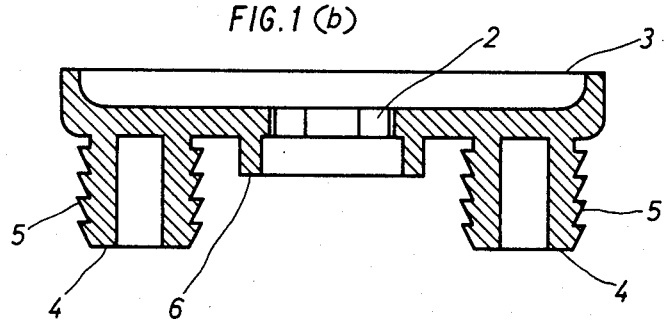
Figure 1:
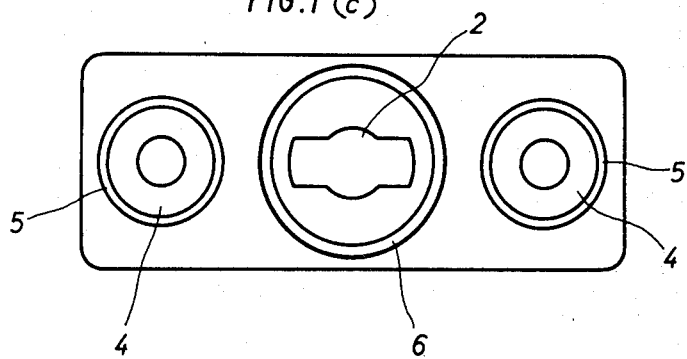
Figure 2A:
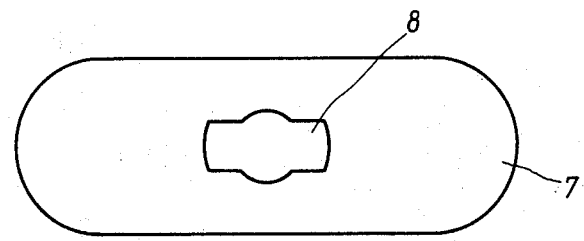
FIG. 2 shows a molded part for a top plate, in which (a) is its top view, (d) is its bottom view, (b) is a cross-sectional view of (d) along Line X—X', and (c) is a cross-sectional view of (d) along Line Y—Y'.
Figure 2B:
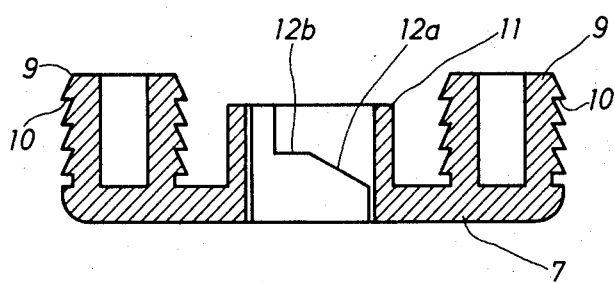
Figure 2C:
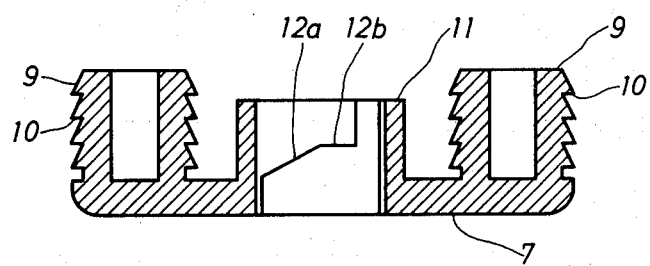
Figure 2D:
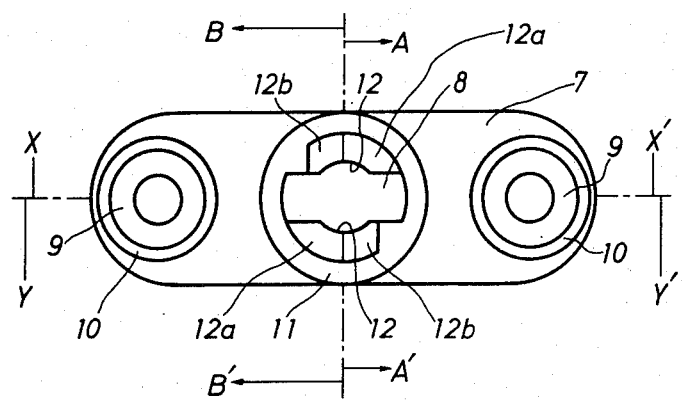

This invention is more particularly described with reference to the drawing showing one example.

(1) is a molded part for the base plate, which is of a female-form, saucer-shaped structure provided with a through hole (2) having a cross section of a ⇌ form in the center for allowing an engaging rod hereinafter described to pass through, and a fringe part (3) around said hole so that the surface of a molded part (7) for the top plate hereinafter described can be tightly increased. (4) and (4) are cylindrical (or which may be solid columnar) fixing leg parts integrally molded on the rear surface of said molded part (1) for the base plate, which leg parts function to fix by being inserted into fixing holes provided on the base plate, and there is a several-pitched dentiform check (5) provided along each outer periphery in the horizontal direction, thereby providing a structure by which the leg parts once inserted are not easily slipped off.

(6) is a cylindrical part also integrally provided on the rear surface of the molded part (1) for the base plate and situated immediately below said ⇌ formed through hole (2), and has the size and height appropriate to allow the flying saucer-shaped head part of the engaging rod hereinafter described to be inserted.

Figure 3:
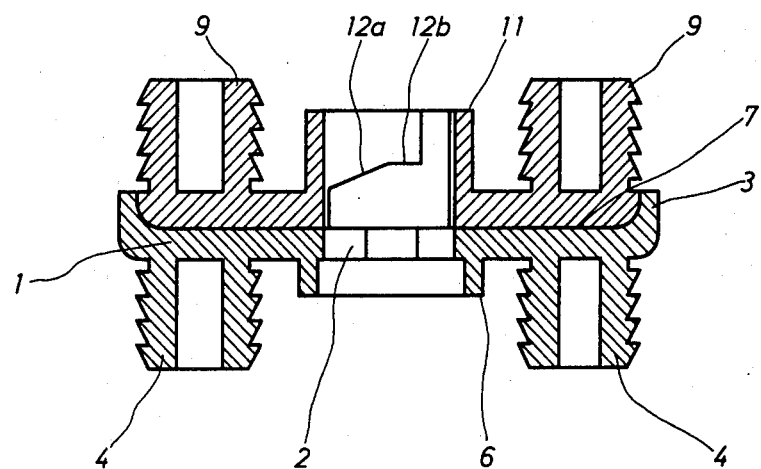
FIG. 3 is a cross-sectional view of the molded part for the top plate inserted into the molded part for the base plate cut along the center line in the longitudinal direction.
Figure 4A:
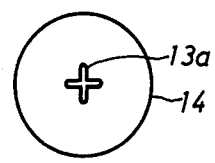
FIG. 4 shows an engaging rod, in which (a) is its bottom view, (b) is a partially cut-off side view, (c) is its front view; and (d) is its top view.
Figure 4B:
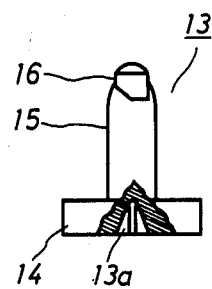
Figure 4C:
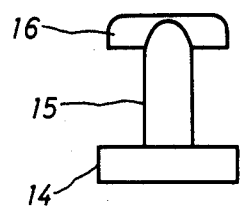
Figure 4D:
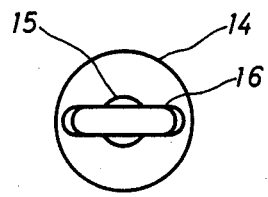

(7) is a molded part for the top plate, and comprises a male-form, flat surface plate-shaped structure provided with a through hole (8) having a cross section of a ⇌ form for allowing the engaging rod hereinafter described to pass through at the position corresponding to that of the through hole (2) on said molded part (1) for the base plate, thereby the surface side can be tightly inserted into said saucer-shaped molded part (1) for the base plate without any play, as shown in FIG. 3. (9) and (9) are cylindrical (or which may be solid columnar) fixing leg parts integrally provided on its rear surface, so as to be inserted into fixing holes provided on the top plate, and there is a several-pitched dentiform check (10) provided along each outer periphery in the horizontal direction, thereby providing a structure by which the leg parts once inserted are not easily slipped off. (11) is a cylindrical part also integrally provided on the rear surface of the molded part (7) for the top plate and situated immediately above said ⇌ formed through hole (8), and has a structure to be engaged with a tip stopper section of the engaging rod hereinafter described. That is, as shown in FIG. 2, the part (11) is of such structure that engaging banks (12) and (12) are provided at symmetrical positions along the inner periphery, each engaging bank being composed of a sloped surface (12a) and a horizontal surface (12b) adjacent thereto, and that by inserting the engaging rod hereinafter described into the through holes (2) and (8) from the back side of the molded part (1) for the base plate, adjusting the direction of the tip stopper section to the common axis of the through holes (2) and (8) and then rotating the stopper section in a right angle to the longitudinal direction, the tip stopper section ascends along the sloped surface (12a) reaching the horizontal surface (12b), where a tensile stress is imposed to tightly fasten and fix the molded part (1) for the base plate and the molded part (7) for the top plate.

FIG. 4 shows one example of an engaging rod used for passing through the through holes (2) and (8) of the above-mentioned molded part (7) for the top plate and the molded part (1) for the base plate, and tightly fastening and fixing these both pasts, comprising a flying saucer-shaped head part (14) having a groove (13a), a solid columnar shaft part (15) integrally connected therewith, and a stopper section (16) at the tip of the shaft part and of a T-shape at a right angle thereto, and the head part (14) being inserted and held in the cylindrical part (6) on the rear surface of the molded part (1) for the base plate, the tip stopper section (16) being constructed so as to be engaged with the engaging structure in the cylindrical part (11) on the rear surface of the molded part (7) for the top plate, as described above.

While materials for the respective molded parts and the engaging rod in the fixing device according to this invention described above may be a metal or a plastic, the engaging rod on which a great tensile stress is applied is preferably made of a metal. Further, as an alternative, in the structure of the engaging rod in the above description, the flying saucer structure of the head part can be replaced by a structure such as a manually rotatable rod provided either in the same direction or at a right angle to the direction on the top stopper section.

Figure 5A:
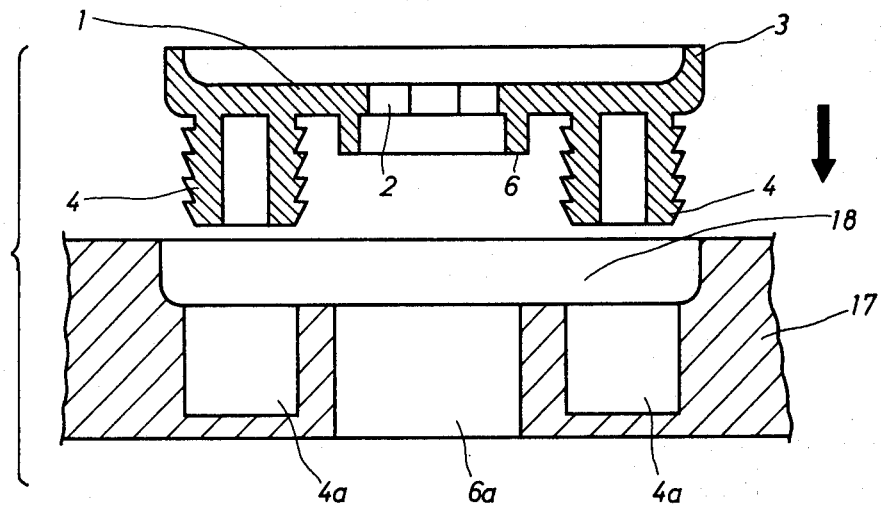
FIG. 5 is a set of cross-sectional views showing the state in use, in which (a) shows the molded part for the base plate being in the course of fixing, and (b) shows the molded part for the top plate being in the course of fixing.
Figure 5B:
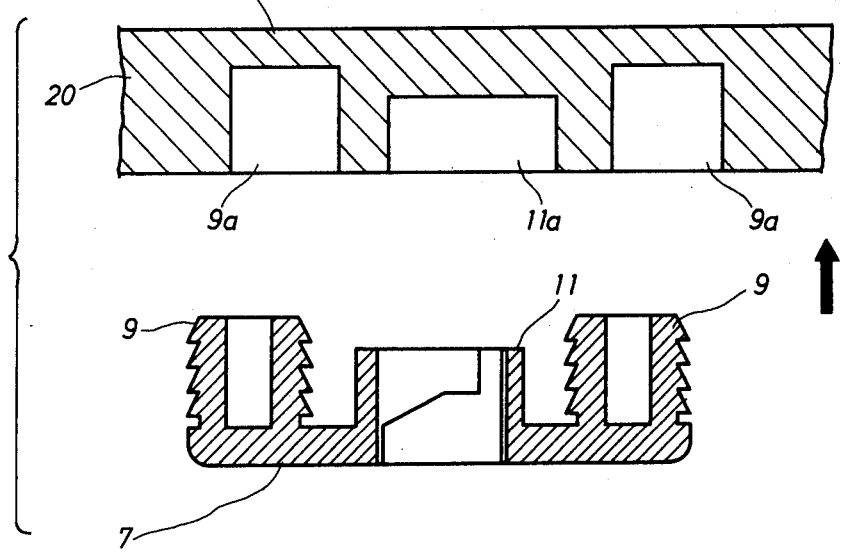

In order to practically employ the fixing device according to this invention, there are firstly provided at a plurality of positions on the base plate (17), a recession (18) having the depth corresponding to the height of the fringe part of the molded part (1) for the base plate, fixing holes (4a) and (4a) for inserting the fixing leg parts (4) and (4) on the rear surface, and a hole (6a) for inserting the cylindrical part (6). In this case, only the hole (6a) must be made as a through hole to the rear surface because it serves to engage with and remove the engaging rod (13). Then, the molded part (1) for the base plate is pushed in the direction indicated by the arrow to be inserted into the recession (18) and the fixing holes (4a) and (6a), thereby fixing it to the surface of the base plate (see FIG. 5 (a)).

Similarly, in order to fit the molded part (7) for the top plate to the rear surface of the top plate (20) provided with a decoration on the top surface (19) via a plurality of positions symmetrical to the fixing positions on the above-mentioned molded part (1) for the base plate, there are provided holes (9a) and (9a) and a hole (11a) for inserting the fixing leg parts (9) and (9) and the cylindrical part (11). In this case, since the surface of the molded part (7) for the top plate is imbedded and fixed to the recessed surface of the above-mentioned molded part (1) for the base plate, it is necessary that each of the holes (9a) and (9a) and the hole (11a) has a depth reduced by the above-mentioned imbedded depth. Then, the molded part (7) for the top plate is pushed in the direction indicated by the arrow to be fitted inserted, thereby fixing it to the rear surface of the top plate (20) (see FIG. 5 (b)).

Figure 6:
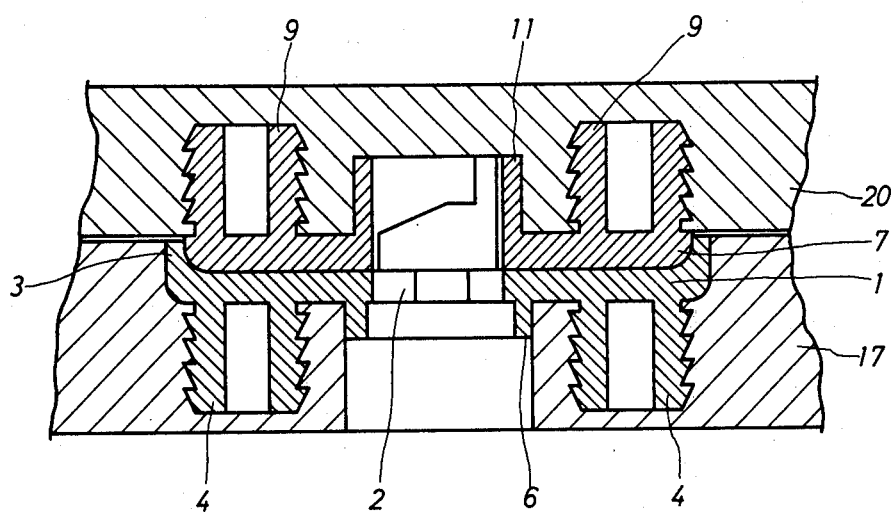
FIG. 6 is also a cross-sectional view showing the state in use, i.e. a cross-sectional view showing the state in which the molded part for the top plate already fixed to the top plate is inserted into the molded part for the base plate already fixed to the base plate.

In order to fix the top plate (20) and the base plate (17), the surface of the molded part (7) for the top plate fitted to the rear surface of the top plate (i.e. a male form) is inserted into the saucer-shaped surface of the molded part (1) for the base plate fitted to the top surface of the base plate (17) (i.e. a female form) (see FIG. 6).

Figure 7B:
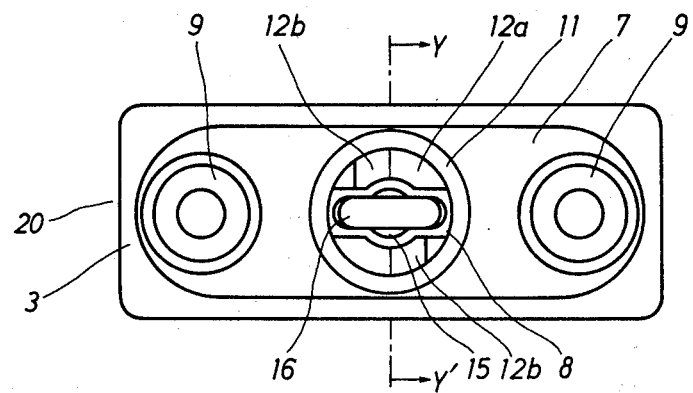
FIG. 7 is a set of views showing how both molded parts are tightly fastened using the engaging rod, and the base plate and the top plate are fixed, in which (a) is its vertical side cross-sectional view, and (b) and (c) are its top views; and in FIG. 8, (a) is a cross-sectional view of FIG. 7 (c) along Line X—X', and (b) is a cross-sectional view of FIG. 7 (b) along Line Y—Y'.
Figure 7C:
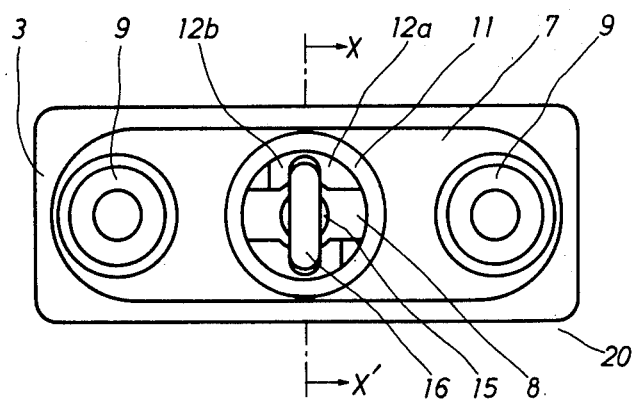
Figures 8A, 8B:
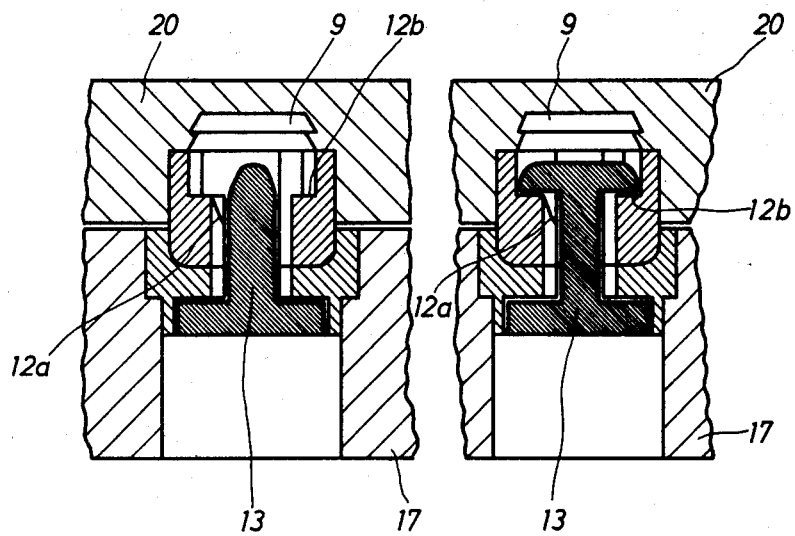

Thereafter, the engaging rod (13) is inserted through the cylindrical part (6) of the molded part (1) for the base plate from the back side of the base plate while its tip stopper section (16) is in the same direction as the common axis of the through holes (2) and (8), and then the engaging rod (13) is strongly rotated in the radial direction from the hole (6a) on the back side of the base plate (17) using the groove (13a) on the head part (14) so that the tip stopper section (16) is engaged and situated on the horizontal surface (12a) of the engaging bank (12) provided on the inner periphery of the cylindrical part (11) of the above-mentioned molded part (17) for the top plate, thereby a tensile stress is imposed on the engaging rod (13) to tightly fasten the molded parts together, thus fixing the top plate (20) and the base plate (17) (see FIG. 7 (a)-(c).

For releasing fixing, operation is also conducted from the back side of the base plate (17), and the engaging rod (13) is reversely rotated to the original direction, thereby engagement is released.

As described above, the fixing device for fixing a base plate and a top plate covering the surface thereof according to this invention comprises a pair of a female-form, saucer-shaped molded part to be fitted to the top surface of the base plate and a male-form, plate-shaped molded part to be fitted to the rear surface of the top plate, which part is fittedly fastened by a tensile stress imposed on an engaging rod which passes through both molded parts by rotating said engaging rod by 90°, and accordingly operations of fitting and fixing as well as releasing fixing are simple, and each operation may be achieved by one action.

INDUSTRIAL APPLICABILITY

As desired above, the fixing device according to this invention enables a top plate having a decoration on a dining table or a salon table to be replaced by another freely at any time, and enables the knock-down production of such furniture. Further, by installing such fixing devices in each set top plates may be changed easily without causing dislocation at the four corners of a dining table, a salon table or the like, thus they are convenient as accessories to furniture.

I claim:

1. A device for fixing two plates to one another, said device comprising:
    a first molded part having opposing first and second surfaces, said molded part including a first through hole extending between central portions of said first and second surfaces, said first through hole having circumferentially opposing elongated portions extending in a first direction, a first upstanding cylindrical portion extending from said first surface and surrounding said first through hole, first fastening means extending from said first surface for fastening to one of said plates, and first engaging means on said second surface;
    a second molded part having opposing third and fourth surfaces, said second molded part including a second through hole extending between central portions of said third and fourth surfaces, a second upstanding cylindrical portion extending from said third surface and surrounding said second through hole, second fastening means extending from said third surface for fastening to a second of said plates, and second engaging means on said fourth surface for engaging said first engaging means such that said second and fourth surfaces are intimately joined in surface contact, wherein said second molded part further includes cam means fixed to the radially inner surface of said second upstanding cylindrical portion, said cam means circumferentially extending about the periphery of said second cylindrical portion except in said first direction, when said first and second molded parts are engaged by said engaging means; and
    an engaging part including a shaft portion, a head portion at one end of said shaft portion and a stopper portion extending transverse to said shaft portion from a second end of said shaft portion,
    whereby said stopper portion is inserted, while oriented in said first direction, from said first surface through said first and second through holes, and is rotated to engage said cam means for locking said first and second molded parts in said engaged condition.

2. The device of claim 1 wherein said cam means consists of a sloped cam surface portion and a locking surface portion.

* * * * *